United States Patent
Sasaki

(10) Patent No.: US 10,855,880 B2
(45) Date of Patent: Dec. 1, 2020

(54) IMAGE FORMING APPARATUS THAT DETERMINES WHETHER A CARTRIDGE MUST BE AUTHENTICATED, CONTROL METHOD THEREOF, STORAGE MEDIUM, AND CARTRIDGE

(71) Applicant: CANON KABUSHIKI KAISHA, Tokyo (JP)

(72) Inventor: Hidemi Sasaki, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/422,877

(22) Filed: Feb. 2, 2017

(65) Prior Publication Data
US 2017/0230540 A1    Aug. 10, 2017

(30) Foreign Application Priority Data
Feb. 10, 2016    (JP) .................................. 2016-023981

(51) Int. Cl.
G03G 15/00 (2006.01)
G03G 21/18 (2006.01)
(Continued)

(52) U.S. Cl.
CPC ..... H04N 1/40006 (2013.01); G03G 21/1892 (2013.01); G06F 21/44 (2013.01);
(Continued)

(58) Field of Classification Search
CPC ........... H04N 1/40006; H04N 1/00538; H04N 1/4433; H04N 1/4426; H04N 2201/0094;
(Continued)

(56) References Cited

U.S. PATENT DOCUMENTS 6,421,137 B1 *    7/2002    Endo .................. G03G 21/1882
                                                    358/1.16
7,249,259 B1 *    7/2007    Vanstone .............. H04L 9/3252
                                                    380/255

(Continued)

FOREIGN PATENT DOCUMENTS

CN    101236401 A    8/2008
CN    101592907 A    12/2009
(Continued)

OTHER PUBLICATIONS

ISO, "ISO/IEC 9797-1:2011, Information technology—Security techniques—Message Authentication Codes (MACSs)—Part 1: Mechanisms using a block cipher", Mar. 1, 2011, https://www.iso.org/obp/ui/#iso:std:50375:en.

(Continued)

*Primary Examiner* — Juan M Guillermety
(74) *Attorney, Agent, or Firm* — Venable LLP

(57) ABSTRACT

This image forming apparatus determines, in accordance with state information indicating the state of the image forming apparatus, whether or not a timing for executing an authentication process of a removable cartridge has arrived. Furthermore, if the timing for executing a cartridge authentication process has arrived, this image forming apparatus obtains authentication information regarding authentication from the cartridge, and determines, from the authentication information, whether or not an authentication process is required to be executed. When an authentication process has been executed, an authentication result is written in a storage area of the cartridge.

21 Claims, 8 Drawing Sheets

(51) Int. Cl.

| | |
|---|---|
| *H04N 1/00* | (2006.01) |
| *H04N 1/40* | (2006.01) |
| *G06F 21/73* | (2013.01) |
| *H04L 29/06* | (2006.01) |
| *G06F 21/44* | (2013.01) |
| *H04L 9/32* | (2006.01) |
| *H04N 1/44* | (2006.01) |

(52) U.S. Cl.
CPC ............ *G06F 21/73* (2013.01); *H04L 9/3247* (2013.01); *H04L 63/123* (2013.01); *H04N 1/00538* (2013.01); *H04N 1/4426* (2013.01); *H04N 1/4433* (2013.01); *G03G 2215/00126* (2013.01); *H04L 63/08* (2013.01); *H04N 2201/0094* (2013.01)

(58) Field of Classification Search
CPC ........... H04N 1/00543; G03G 21/1892; G03G 15/0863; G03G 21/1878; G03G 2215/00126; G03G 2215/0697; G03G 2221/1823; G03G 15/087; G03G 15/0836; G03G 15/0877; G03G 15/0879; G03G 21/1825; G03G 21/1839; G03G 21/1842; G03G 21/1875; G03G 2215/066; G03G 21/1638; G03G 2215/00548; G03G 2221/1675; G03G 15/2035; G03G 15/234; G03G 2215/00586; G03G 2215/0141; G03G 2215/00438; G03G 21/1814; G03G 21/1867; G03G 2215/0097; G03G 2215/183; H04L 9/3247; G06F 21/73; G06F 21/44; G05B 2219/32226; G05B 2219/32234; G05B 2219/14112; G05B 2219/23373; G05B 2219/24019; G06K 15/4055; G06K 15/18; B41J 2/17506; B41J 2/17526; B41J 2/17543; B41J 2/17559; B41J 2029/3937
USPC ........................................... 358/1.15; 399/12
See application file for complete search history.

(56) References Cited

U.S. PATENT DOCUMENTS

| | | | | |
|---|---|---|---|---|
| 2002/0131784 A1* | 9/2002 | Takemoto | .......... | G03G 21/1892 399/12 |
| 2002/0164168 A1* | 11/2002 | Hayakawa | ......... | G03G 21/1889 399/12 |
| 2005/0078969 A1* | 4/2005 | Kikuchi | ............. | G03G 21/1892 399/12 |
| 2005/0108548 A1 | 5/2005 | Ohta | | |
| 2005/0141901 A1* | 6/2005 | Lee | ................... | G03G 15/0863 399/27 |
| 2005/0254837 A1* | 11/2005 | Takahashi | .......... | G03G 15/0863 399/12 |
| 2005/0254841 A1* | 11/2005 | Tomitaka | .......... | G03G 15/0863 399/12 |
| 2006/0034626 A1* | 2/2006 | Tanaka | ............... | G03G 21/1889 399/12 |
| 2006/0216044 A1* | 9/2006 | Itabashi | ............. | G03G 15/0863 399/12 |
| 2006/0216046 A1* | 9/2006 | Hatakeyama | ...... | G03G 15/0863 399/27 |
| 2007/0079125 A1 | 4/2007 | Adkins et al. | | |
| 2007/0297815 A1* | 12/2007 | Takada | ............... | G03G 15/0863 399/12 |
| 2008/0181638 A1* | 7/2008 | Fujioka | .............. | G03G 15/0856 399/58 |
| 2008/0240745 A1* | 10/2008 | Hibino | ............... | G03G 15/0856 399/24 |
| 2008/0317479 A1* | 12/2008 | Kadowaki | ........... | G03G 15/556 399/12 |
| 2010/0157339 A1* | 6/2010 | Yamada | ............. | G03G 15/0863 358/1.9 |
| 2010/0202788 A1* | 8/2010 | Suda | ................... | G03G 21/1892 399/27 |
| 2011/0044703 A1* | 2/2011 | Fuse | .................. | G03G 15/0863 399/12 |
| 2012/0044285 A1* | 2/2012 | Ogasawara | ............... | B41J 2/175 347/6 |
| 2013/0070279 A1* | 3/2013 | Misumi | ................... | G06F 21/44 358/1.14 |
| 2013/0108282 A1* | 5/2013 | Sonoda | ............. | G03G 21/1889 399/12 |
| 2013/0321853 A1 | 12/2013 | Lee et al. | | |
| 2014/0003836 A1* | 1/2014 | Burchette | .......... | G03G 15/0894 399/109 |
| 2015/0086014 A1 | 3/2015 | Adkins | | |
| 2016/0014286 A1* | 1/2016 | Kishida | ................. | H04N 1/4426 358/1.15 |
| 2016/0124344 A1* | 5/2016 | Kojo | .................. | G03G 15/0863 399/12 |
| 2016/0173284 A1* | 6/2016 | Jeran | .................. | G03G 15/0863 713/180 |
| 2016/0291521 A1* | 10/2016 | Nagata | ............... | G03G 15/0863 |
| 2017/0075277 A1* | 3/2017 | Kanakubo | .......... | G03G 21/1889 |

FOREIGN PATENT DOCUMENTS

| | | |
|---|---|---|
| CN | 101995807 A | 3/2011 |
| CN | 102998958 A | 3/2013 |
| JP | 2005-070254 A | 3/2005 |
| JP | 2005-167977 A | 6/2005 |
| JP | 2007-208825 A | 8/2007 |
| JP | 2008-152419 A | 7/2008 |
| WO | 2015/016863 A1 | 2/2015 |

OTHER PUBLICATIONS

U.S. Department of Commerce, FIPS PUB 186-3: Federal Information Processing Standards Publication, Digital Signature Standard (DSS), Jun. 2009, http://csrc.nist.gov/publications/fips/fips186-3/fips_186-3.pdf.
European Search Report dated Jun. 14, 2017, in European Patent Appln. No. 17153465.4.
European Search Report issued in corresponding European Application No. 18185721.0 dated Dec. 10, 2018.
Chinese Office Action issued in corresponding Chinese Application No. 201710062417.4 dated Aug. 21, 2019.
Korean Office Action issued in corresponding Korean Application No. 10-2017-0017893 dated Dec. 18, 2019.

* cited by examiner

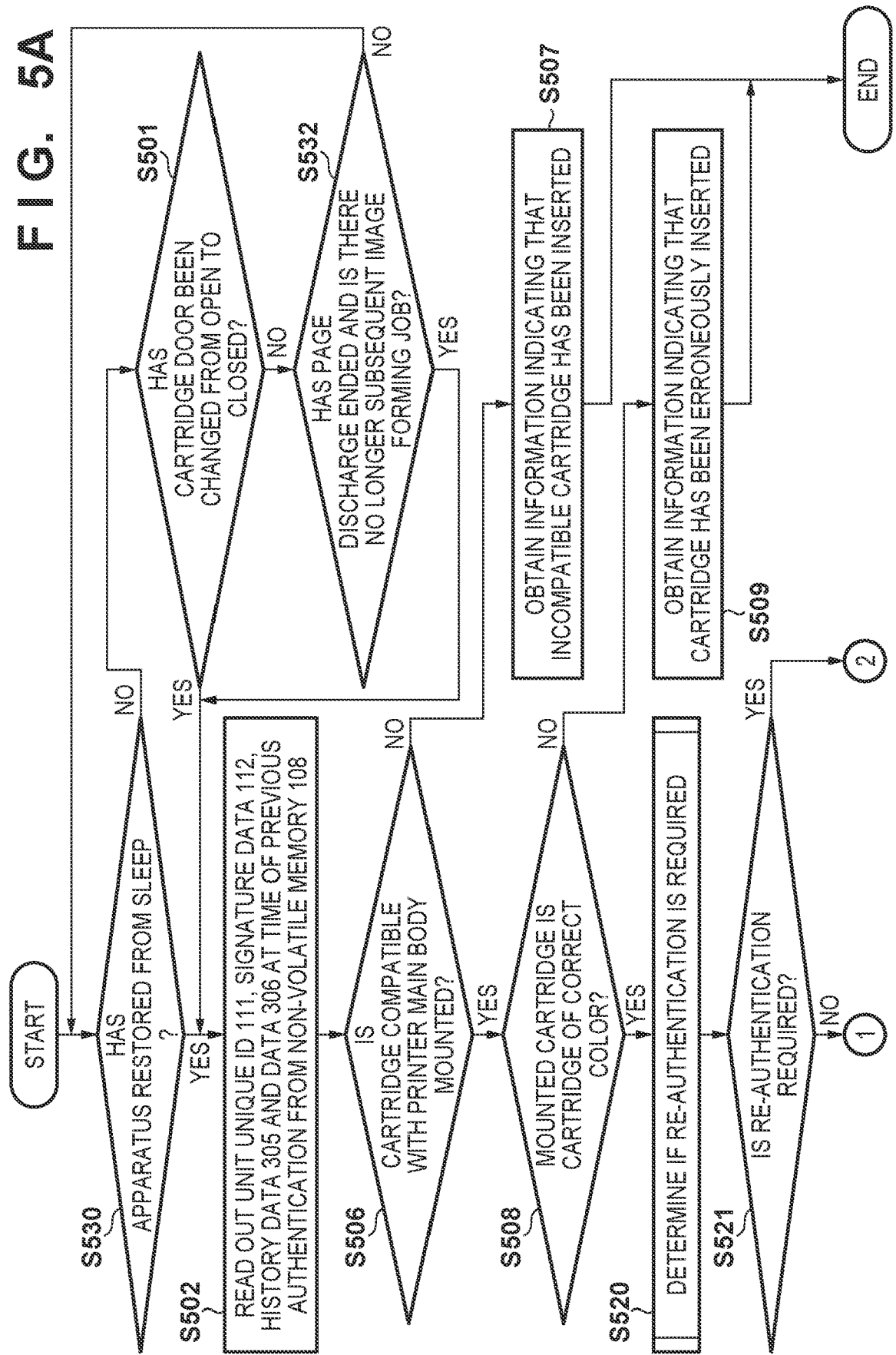

IMAGE FORMING APPARATUS THAT DETERMINES WHETHER A CARTRIDGE MUST BE AUTHENTICATED, CONTROL METHOD THEREOF, STORAGE MEDIUM, AND CARTRIDGE

BACKGROUND OF THE INVENTION

Field of the Invention

The present invention relates to an image forming apparatus, a control method thereof, a storage medium, and a cartridge.

Description of the Related Art

In multifunction printers that have a print function and a copy function, a service of replacing consumables and periodic replacement parts in units such as process cartridges is provided. Also, a process cartridge is often equipped with a memory IC for storing ID information, optimum operation information and the like of the process cartridge, and there are cases where the stored information also includes main body control information for changing the operations of the main body in which the process cartridge is mounted.

If unauthorized main body control information had been written in the memory IC, it is possible that the printer body lifetime will be adversely affected.

ISO, "ISO/IEC 9797-1: 2011", Information technology—Security techniques—Message Authentication Codes (MACs)—Part 1: Mechanisms using a block cipher ([online], Mar. 1, 2011 [retrieved on Jan. 20, 2016], Internet <https://www.iso.org/obp/ui/#iso:std:50375:en>) describes a message authentication code technique in which an apparatus to be authenticated that is mounted and an authentication apparatus that performs authentication each have a common key. Also, the US Department of Commerce, FIPS PUB 186-3: Federal information processing standards publication Digital Signature Standard (DSS) ([online], June 2009, [retrieved on Jan. 20, 2016], Internet <http://csrc.nist.gov/publications/fips/fips186-3/fips_186-3.pdf>) describes an electronic signature method in which an apparatus to be authenticated that is mounted or a writing apparatus that stores signature data in the apparatus to be authenticated and an authentication apparatus that performs authentication have a pair or keys, rather than a common key. Furthermore, Japanese Patent Laid-Open No. 2005-167977 proposes a product validity verification system for verifying whether or not there has been product tampering or substitution, using such authentication methods.

However, the above-described conventional techniques have an issue that will be described below. In order to reliably verify whether or not a cartridge is a predetermined process cartridge, cartridge re-authentication needs to be performed every time there is a possibility that the cartridge has been replaced. The predetermined process cartridge is, for example, a process cartridge which is supposed by a manufacturer of the image forming apparatus to be a process cartridge for the image forming apparatus. In order to replace a cartridge of an image forming apparatus, an operation of opening/closing a main body cover is performed. It is desirable to use this to perform re-authentication of all the mounted cartridges when the image forming apparatus detects that the user has closed the main body cover using a sensor. However, there is a risk that foreign material causes the sensor to erroneously determine that the cover is always closed, and that a cartridge that would be successfully authenticated is replaced by another cartridge that would not be successfully authenticated and the unauthorized cartridge is used. Therefore, it is desirable that the image forming apparatus periodically carries out cartridge re-authentication even if opening/closing of the main body cover is not detected.

Furthermore, there are also image forming apparatuses in which a cartridge can be replaced by opening/closing the main body cover even if the image forming apparatus is turned off. Moreover, some recent image forming apparatuses have a sleep mode for stopping power supply to some components in order to suppress standby power when the apparatus is not being used. These include image forming apparatuses that cannot detect mounting/removal of a cartridge in the sleep mode. Therefore, cartridge authentication is desirably performed immediately after power is supplied or immediately after restoration from the sleep mode.

However, as with the above-described conventional technique, complicated calculation is required for decoding signature data in order to authenticate a cartridge. Therefore, if cartridge authentication is frequently performed, there is a problem in that the time required for outputting the first page after restoration from sleep or immediately after cartridge replacement becomes longer. This problem becomes significant with a color product that requires a plurality of cartridges.

Incidentally, if a component used for authentication has a shorter lifetime than the entire cartridge, the authentication result will be incorrect, and a predetermined process cartridge will be determined not to be the predetermined process cartridge. The process cartridge which is not the predetermined process cartridge is, for example, a process cartridge which is not supposed by a manufacturer of the image forming apparatus to be a process cartridge for the image forming apparatus. Therefore, in order to prolong the lifetime of the component used for authentication, it is also necessary to suppress the number of times that cartridge authentication is performed.

SUMMARY OF THE INVENTION

The present invention enables realization of a mechanism capable of suitably verifying whether or not a cartridge that can be mounted in an image forming apparatus is a predetermined process cartridge, while suppressing the number of times that authentication of the cartridge is performed.

One aspect of the present invention provides an image forming apparatus comprising: a storage that stores a predetermined setting information; a memory device that stores a set of instructions; and at least one processor that executes the instructions to: determine whether or not a timing for executing an authentication process of a cartridge that is attachable to and detachable from the image forming apparatus has arrived, in accordance with state information indicating a state of the image forming apparatus, obtain authentication information regarding authentication from a storage area provided in the cartridge, if it is determined that the timing for executing an authentication process of the cartridge has arrived, determine, from the obtained authentication information, whether or not an authentication process is required to be executed, and execute the authentication process using the authentication information if it is determined that the authentication process is required to be executed, and write an authentication result as new authentication information to the storage area.

Another aspect of the present invention provides a control method of an image forming apparatus, comprising: determining, as trigger determination, whether or not a timing for executing an authentication process of a cartridge that is attachable to and detachable from the image forming apparatus has arrived, in accordance with state information indicating a state of the image forming apparatus; obtaining authentication information regarding authentication from a storage area provided in the cartridge, if it is determined in the trigger determination that the timing for executing an authentication process of the cartridge has arrived; determining, as re-authentication determination, whether or not an authentication process is required to be executed, from the authentication information obtained in the obtaining; and executing the authentication process using the authentication information if it is determined in the re-authentication determination that the authentication process is required to be executed, and writing an authentication result as new authentication information to the storage area.

Still another aspect of the present invention provides a non-transitory computer-readable storage medium storing a computer program for causing a computer to execute each step of a control method of an image forming apparatus, the method comprising: determining, as trigger determination, whether or not a timing for executing an authentication process of a cartridge that is attachable to and detachable from the image forming apparatus has arrived, in accordance with state information indicating a state of the image forming apparatus; obtaining authentication information regarding authentication from a storage area provided in the cartridge, if it is determined in the trigger determination that the timing for executing an authentication process of the cartridge has arrived; determining, as re-authentication determination, whether or not an authentication process is required to be executed, from the authentication information obtained in the obtaining; and executing the authentication process using the authentication information if it is determined in the re-authentication determination that the authentication process is required to be executed, and writing an authentication result as new authentication information to the storage area.

Yet still another aspect of the present invention provides a cartridge that is attachable to and detachable from an image forming apparatus, comprising; an IC tag for transmitting and receiving information to and from the image forming apparatus, wherein the IC tag includes a non-volatile memory that stores: a unit unique ID that includes information unique to the cartridge, signature data obtained by encrypting the unit unique ID and main body control data that is control information of the cartridge, history data that includes a page count indicating at least a number of pages onto which an image forming job was executed, and last authentication data that indicates information obtained when authentication was performed last time.

Further features of the present invention will be apparent from the following description of exemplary embodiments with reference to the attached drawings.

BRIEF DESCRIPTION OF THE DRAWINGS

FIGS. 5A-5B are diagrams illustrating an authentication flow of data stored in a process cartridge according to one embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Configuration of Image Forming Apparatus

A first embodiment of the present invention will be described below. First, the schematic configuration of an image forming apparatus equipped with an authentication system according to this embodiment will be described with reference to FIG. 2. A case of a laser beam printer as an example of the image forming apparatus will be described in this embodiment by way of example. This embodiment is directed to a laser beam printer that is capable of monochrome printing, that is, a laser beam printer whose process cartridge is of K color only. However, the present invention is not limited thereto, and can also be applied to a laser beam printer that uses process cartridges of C color, M color, Y color and K color and is capable of color printing. It is also possible to apply a separate-cartridge-type laser beam printer whose photosensitive drum and toner unit are stored in different cartridges. Additionally, the present invention can also be realized with regard to an image forming apparatus that does not adopt an electrophotographic method. For example, the present invention can also be applied to an inkjet printer. In this case, the present invention is applied to an authentication method performed on an ink cartridge by the inkjet printer.

Figure 2:
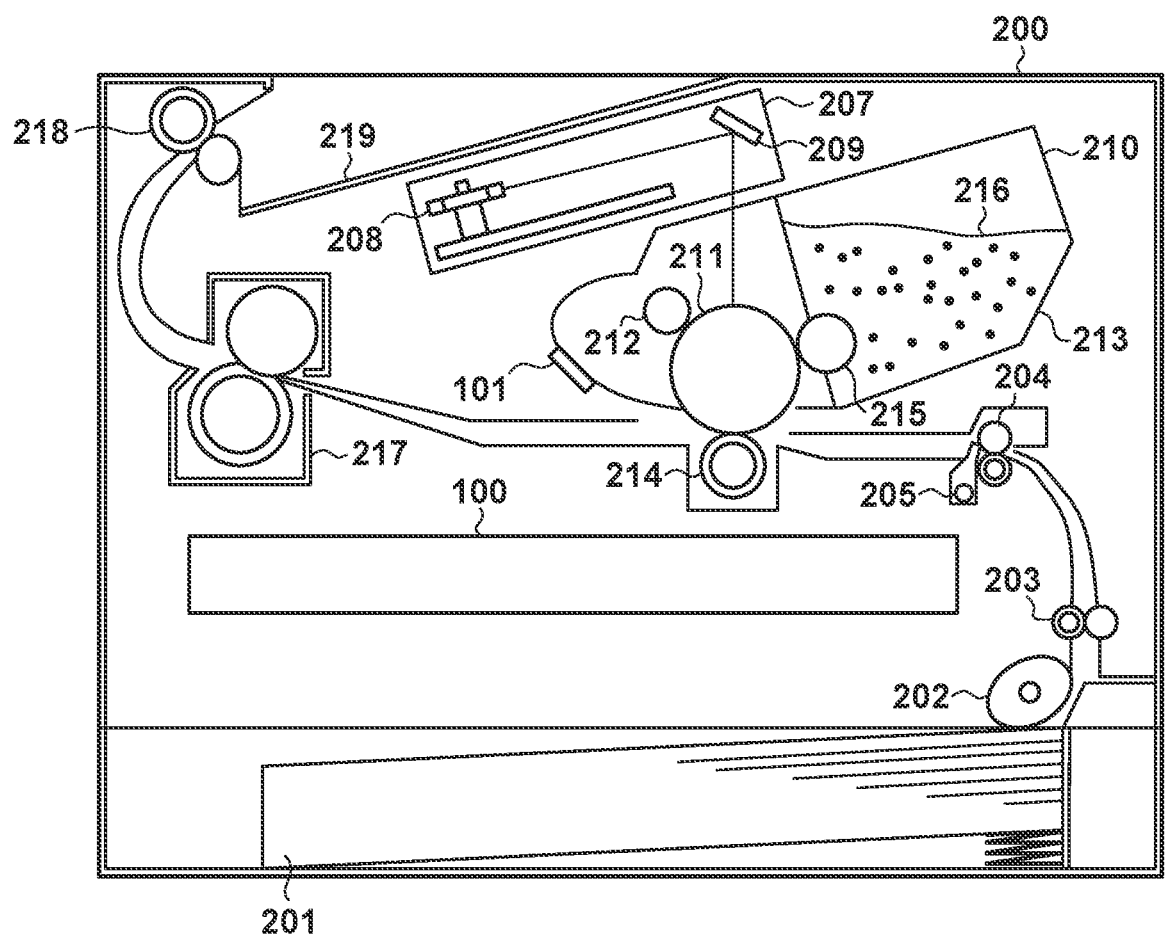
FIG. 2 is a diagram illustrating an image forming apparatus according to one embodiment.

In FIG. 2, reference numeral 200 denotes an image forming apparatus, and reference numeral 201 denotes a paper feeding cassette for accommodating a recording material (also referred to as recording paper or a sheet) that is fed and conveyed in the image forming apparatus 200, and on which an image is formed. The recording paper accommodated in the feeding cassette 201 is picked up by a feeding roller 202 arranged on the upper front face of the feeding cassette 201, and is fed toward a first conveyance roller pair 203.

The first conveyance roller pair 203 conveys the recording paper to a second conveyance roller pair 204. The recording paper is then conveyed to a transfer roller 214 by the second conveyance roller pair 204. Reference numeral 205 denotes a resister sensor that is used for synchronizing a light emission timing at the leading edge position of the recording paper and a scanner unit 207, which is an exposure unit, and for determining the position of a visualized image on the recording paper.

Reference numeral 210 denotes a process cartridge that is removable from the image forming apparatus 200. The process cartridge 210 is provided with a photosensitive drum 211 as an image carrier, and has a charging roller 212 and a developing device 213 around this photosensitive drum 211. The developing device 213 is formed, as a developing unit, integrally within the process cartridge 210, has a developing roller 215 opposing the photosensitive drum 211 and the like, and has toner 216 housed therein as a developing material.

Figure 1:
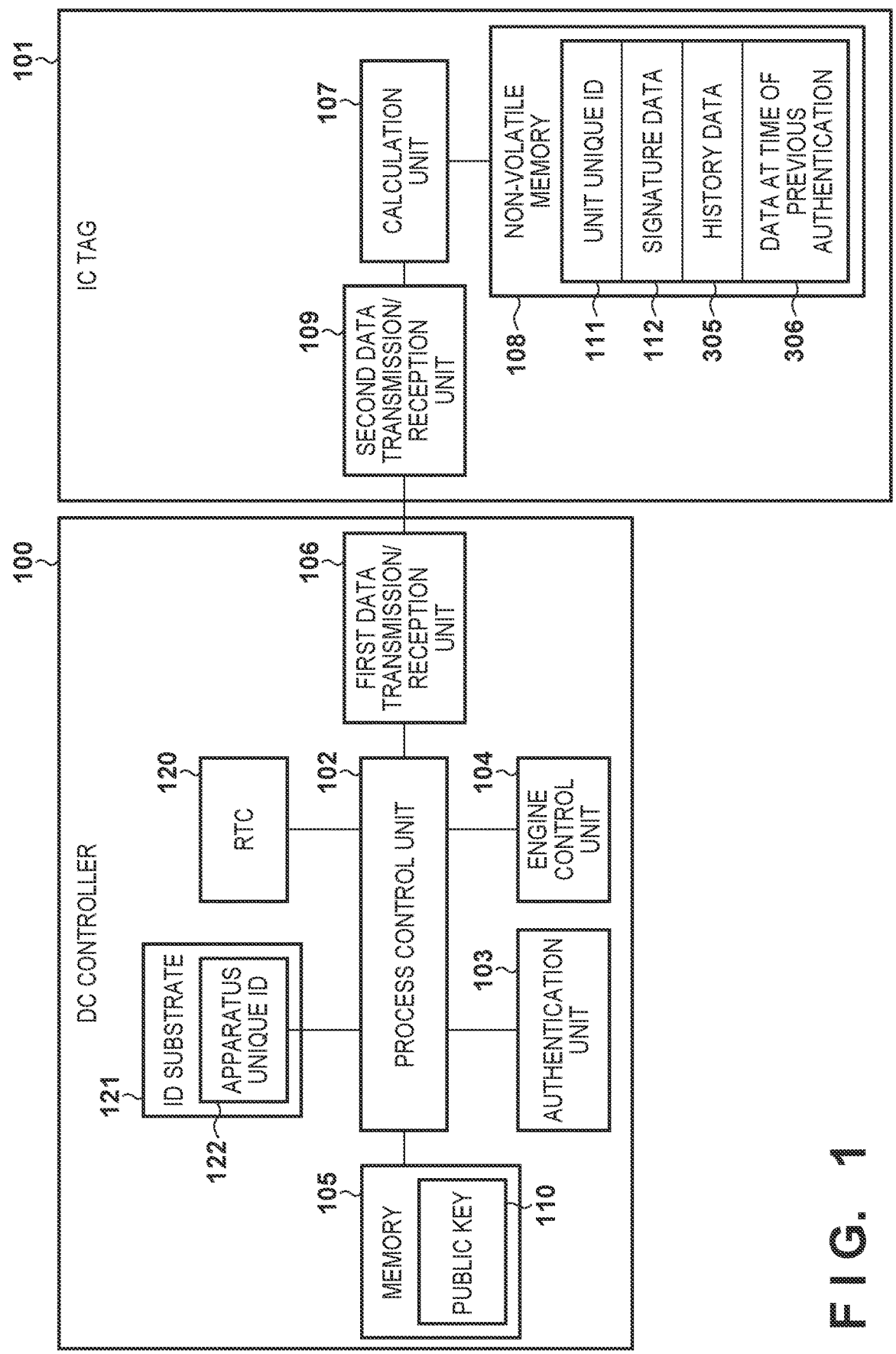
FIG. 1 is a diagram illustrating the configuration and connection mode of a DC controller and an IC tag according to one embodiment.

An IC tag 101 as shown in FIG. 1 is added to the process cartridge 210. The IC tag 101 is electrically connected, at a physical contact point or using a loop coil or the like, to a DC controller 100 for controlling the operation of the image forming apparatus 200. The IC tag 101 is provided with a second data transmission/reception unit 109 for performing data communication with the DC controller 100, a calculation unit 107 for processing received data, and a non-volatile memory 108.

A unit unique ID 111 that is unique to the cartridge and signature data 112 are stored in the non-volatile memory 108. The signature data 112 is data obtained by performing signature processing on at least the unit unique ID 111 and main body control data 303 that is data for controlling the image forming apparatus 200 by a public key encryption method. Also, history data 305 in which a usage history of the process cartridge 210 is recorded every time the process cartridge 210 is used, and data 306 at the time of the last authentication in which the state at the time of the last authentication is recorded are stored.

Figure 4:
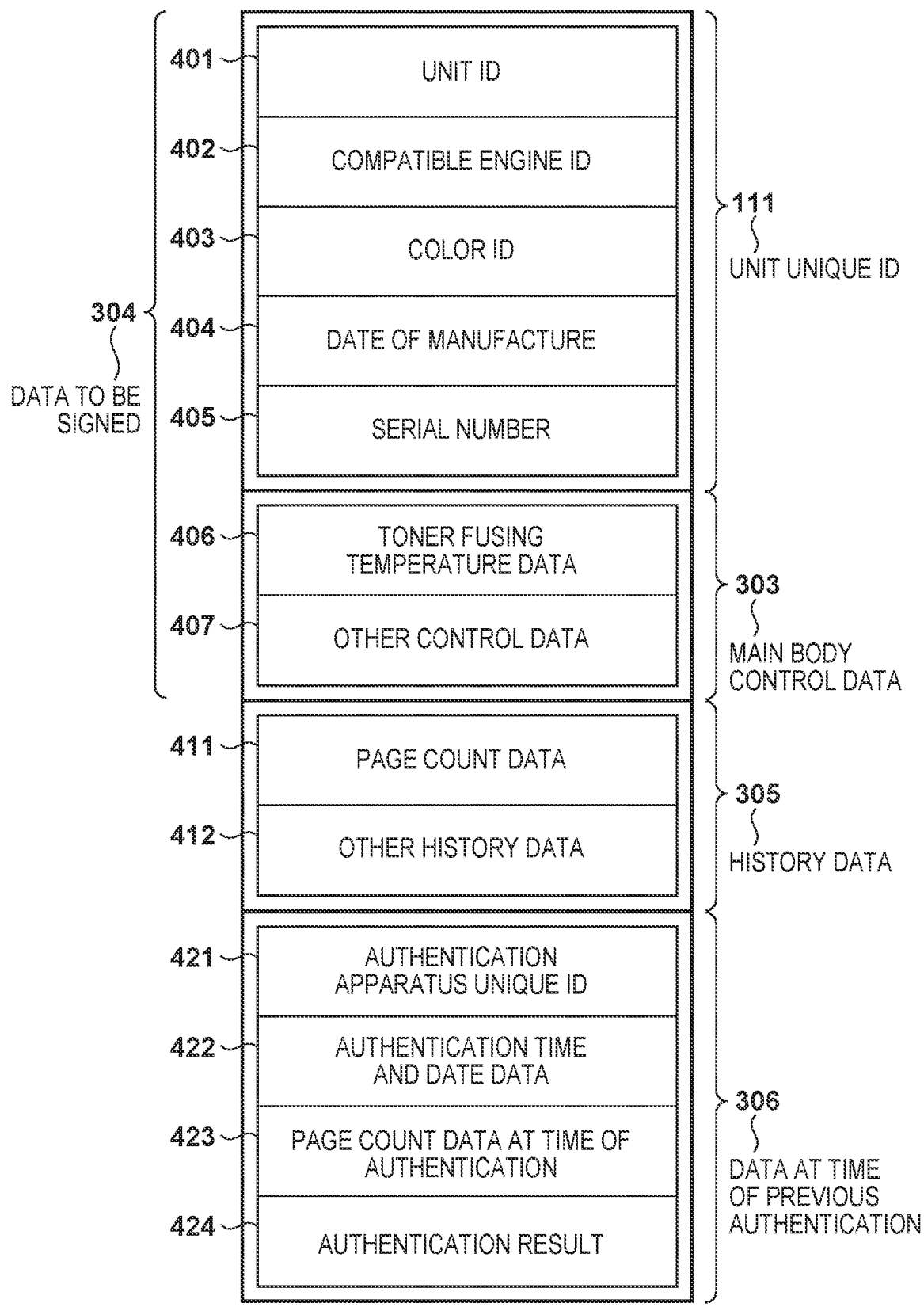
FIG. 4 is a diagram showing an example of a unit unique ID and main body control data according to one embodiment.

Here, data contained in the non-volatile memory 108 will be described in detail with reference to FIG. 4. As shown in FIG. 4, the unit unique ID 111 is constituted to include a unit ID 401, a compatible engine ID 402, a color ID 403, a date of manufacture 404 and a serial number 405. The unit ID 401 indicates the type of unit. The compatible engine ID 402 indicates a type of image forming apparatus 200 that is compatible with the unit. The color ID 403 indicates the color of the toner 216 stored in the unit. The date of manufacture 404 indicates the time and date when the unit was manufactured. The serial number 405 is a number provided for each unit.

Also, the main body control data 303 is constituted to include, for example, toner fusing temperature data 406 indicating the fusing temperature of the toner 216 of the unit, and other control data 407 that is data for correcting control of the image forming apparatus 200 based on characteristics unique to the unit.

The history data 305 is constituted to include page count data 411 for managing the number of sheets printed using the process cartridge, and other history data 412. The page count data 411 is updated at a timing when printing in a range of a certain number of sheets has been performed, or at a timing when processing of all print jobs received from the outside has been completed. In the page count data 411, detailed history information may be stored, for example, for each paper size used for output. Other usage histories may also be stored similarly to the other history data 412.

The data 306 at the time of the last authentication is constituted to include an authentication apparatus unique ID 421, authentication time and date data 422, page count data 423 at the time of authentication and an authentication result 424. The authentication apparatus unique ID 421 is data indicating an identifier unique to each image forming apparatus used for authentication. The authentication time and date data 422 is data indicating information regarding the time when an authentication process in the image forming apparatus was performed. The page count data 423 at the time of authentication is data indicating information regarding page count data recorded in the page count data 411 at a stage when authentication was performed. The authentication result 424 is data for holding information regarding whether or not process cartridge authentication was successful.

Description will return to FIG. 2. The scanner unit 207 is provided with a laser device, a polygon mirror 208, a reflection mirror 209 and the like. The laser device emits a light beam in accordance with image information. The polygon mirror 208 scans the emitted laser beam. The reflection mirror 209 reflects the laser beam scanned by the polygon mirror 208 to the photosensitive drum 211. Reference numeral 217 denotes a fixing device for heat-fixing an image visualized by the toner 216 formed on recording paper. The recording paper after being heat-fixed is discharged on a paper discharge tray 219 formed integrally with an exterior cover, by a paper discharge roller pair 218.

Next, an image forming step in the image forming apparatus 200 according to this embodiment will be described. The photosensitive drum 211 is rotated, the surface of the photosensitive drum 211 is uniformly charged to a predetermined polarity by the charging roller 212 during the rotation process, the scanner unit 207 scans and exposes an emitted laser beam, and an electrostatic latent image is formed on the surface of the photosensitive drum 211. The electrostatic latent image is developed with the toner 216 supported and conveyed on the developing roller 215 in the developing device 213, and is visualized as a toner image. The obtained toner image is absorbed by the transfer roller 214 that provides, from the back side of the recording paper synchronized for writing, an electric charge having a polarity opposite to the charging polarity of the toner 216, and is transferred onto the surface of the recording paper. The recording paper onto which the toner image has been transferred is conveyed to a fixing device 217 so as to fuse and fix the toner image by heating and pressurizing, then travels through the paper discharge roller pair 218, and is discharged on the paper discharge tray 219. When a paper discharge process ends, in the case where paper discharge in a range of a certain number of sheets has been performed from the time when the page count data 411 was updated last time, or there is no subsequent print job, the DC controller 100 updates the page count data 411 so as to increase by the number of printed pages.

Here, each type of the toner 216 stored in the process cartridge 210 has different characteristics in accordance with components constituting the toner, and as one of the characteristics, a fusing temperature is different depending on the toner components. Therefore, it is preferred that the heating temperature of the fixing device 217 is an optimum temperature for the toner that is used. However, if the heating temperature of the fixing device 217 is too high or too low, there is a possibility that the main body of the image forming apparatus 200 will be damaged, and the lifetime is adversely affected. Therefore, it is necessary to incorporate a mechanism that does not damage the image forming apparatus 200 even in the case where a process cartridge which is not the predetermined process cartridge is mounted. The predetermined process cartridge is, for example, a process cartridge which is supposed by a manufacturer of the image forming apparatus to be a process cartridge for the image forming apparatus.

A method for an image forming apparatus to periodically perform cartridge authentication while suppressing the number of times of authentication will be described below with reference to FIGS. 1, 3 and 4.

Control Configuration of DC Controller and IC Tag

First, the control configuration of the DC controller 100 for controlling the operation of the image forming apparatus 200 and the control configuration of the IC tag 101 added to the process cartridge 210 will be described with reference to FIG. 1.

The DC controller 100 is provided with, as a control configuration, a process control unit 102, an authentication unit 103, an engine control unit 104, a memory 105, a first data transmission/reception unit 106, an RTC 120 and an ID substrate 121. Also, the IC tag 101 is provided with the calculation unit 107, the non-volatile memory 108 and the second data transmission/reception unit 109.

Here, the process control unit 102, the authentication unit 103 and the engine control unit 104 are realized by a CPU (not illustrated) provided in the image forming apparatus 200 executing a program loaded from a storage medium such as an HDD (not illustrated) to the memory 105. The present invention can be achieved in various aspects, and this embodiment is merely an example thereof. For example, the storage medium to which the program is loaded may be a hard disk, a Flash ROM, or a solid state drive. In addition, the authentication unit 103 may be realized by a hard chip for performing an authentication process and a driver program for operating the hard chip, or may be realized by a software library for authentication. Furthermore, an entirety or a portion of the processes of the process control unit 102 may be realized by using an FPGA or a reconfigurable processor (not illustrated). Alternatively, the process control unit 102 may be realized by cooperation of a plurality of CPUs. In addition, various techniques can be used for an interface that connects the engine control unit 104 to an actual printer engine, or an interface between the first data transmission/reception unit 106 and the second data transmission/reception unit 109.

In the following description, describing all the variations of the achievement methods would be complicated, and thus only basic aspects required for clarifying the spirits of the invention will be mentioned. The first data transmission/reception unit 106 performs data communication between the DC controller 100 and the IC tag 101. The process control unit 102 performs overall control of the processes of the image forming apparatus 200. The authentication unit 103 detects whether or not data stored in the non-volatile memory 108 is normal data. The process control unit 102 records, in the memory 105, the state of the printer engine that has been notified by the engine control unit 104. The process control unit 102 also records, in the memory 105, data of an image forming job that is to be subjected to image formation and the state of an image forming job to be processed.

The engine control unit 104 executes operation control of the image forming apparatus 200 decided by the process control unit 102. Also, the engine control unit 104 notifies the process control unit 102 of the state of the printer engine. For example, the process control unit 102 is notified that the main body cover has been opened/closed, a main body power supply switch has been pressed, and the like. The memory 105 is a memory for temporarily or permanently holding data. For example, printer states such as whether or not the image forming apparatus has just been restored from sleep and whether or not the main body cover has been opened, information of a print job and the like are recorded in the memory 105. The real-time clock module (RTC) 120 obtains time information. The ID substrate 121 holds an apparatus unique ID 122, which is an identifier of the image forming apparatus. The apparatus unique ID 122 is an identifier that is different for each image forming apparatus.

Note that all of the functions of the process control unit 102, the authentication unit 103, the engine control unit 104 and the memory 105 may be included in one CPU. The configuration of the IC tag 101 has been described above, and is thus omitted here. The DC controller 100 and the IC tag 101 are electrically connected via the first data transmission/reception unit 106 and the second data transmission/reception unit 109, and data transmission/reception is performed through these two transmission/reception units.

Figure 3:
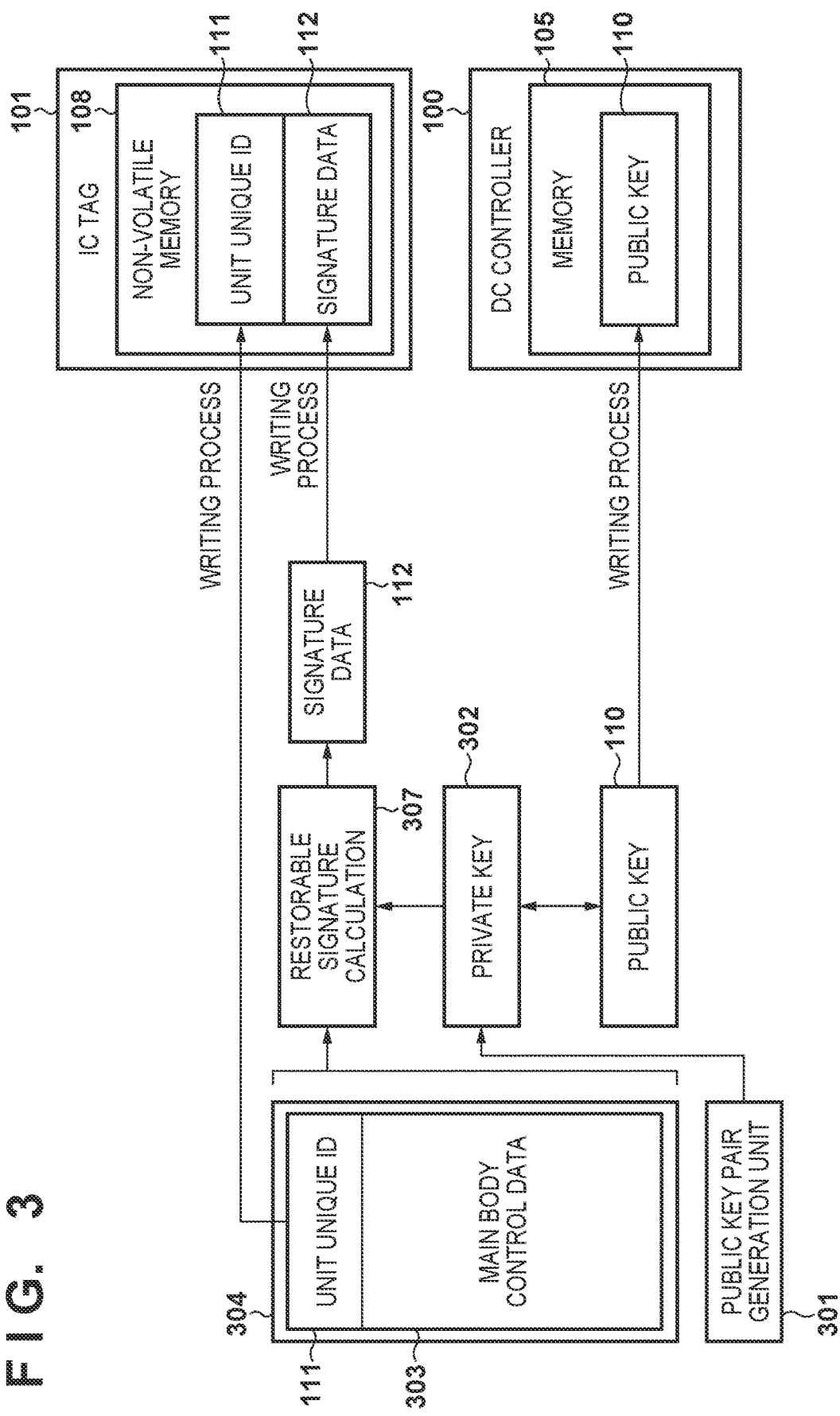
FIG. 3 is a diagram illustrating writing of data to the DC controller and the IC tag in an assembly factory according to one embodiment.

It is desirable that initial data is written in the non-volatile memory 108 and the memory 105 in an assembly factory by following the steps as shown in FIG. 3. The unit unique ID 111 constituted by data as shown in FIG. 4 and the signature data 112 obtained by performing a signature process on data 304 to be signed are stored in the non-volatile memory 108 in the IC tag 101. Here, the data 304 to be signed is constituted to include the unit unique ID 111 and the main body control data 303. The non-volatile memory 108 in the IC tag 101 also stores the history data 305 and the data 306 at the time of the last authentication, although illustration is omitted.

Here, the signature data 112 is obtained by encrypting the data 304 to be signed, by performing restorable signature calculation 307 represented by ISO 9796-2 or the like, for example. The data 304 to be signed is set to less than or equal to a data amount that enables restoration determined by the restorable signature calculation 307. A private key 302 used for the restorable signature calculation 307 is generated in advance by a public key pair generation unit 301. Also, a public key 110 paired with the private key 302 is generated at the same time as the private key 302 by the public key pair generation unit 301, and is stored in the memory 105 in the DC controller 100.

The calculation unit 107 performs calculation related to writing of information in the non-volatile memory 108, and readout of information from the non-volatile memory 108. Furthermore, the calculation unit 107 is connected to the second data transmission/reception unit 109 using a communication line, and performs control for passing, to the second data transmission/reception unit 109, information read out from the non-volatile memory 108, and writing, in the non-volatile memory 108, information passed from the second data transmission/reception unit 109.

Processing Procedure

Figure 5B:
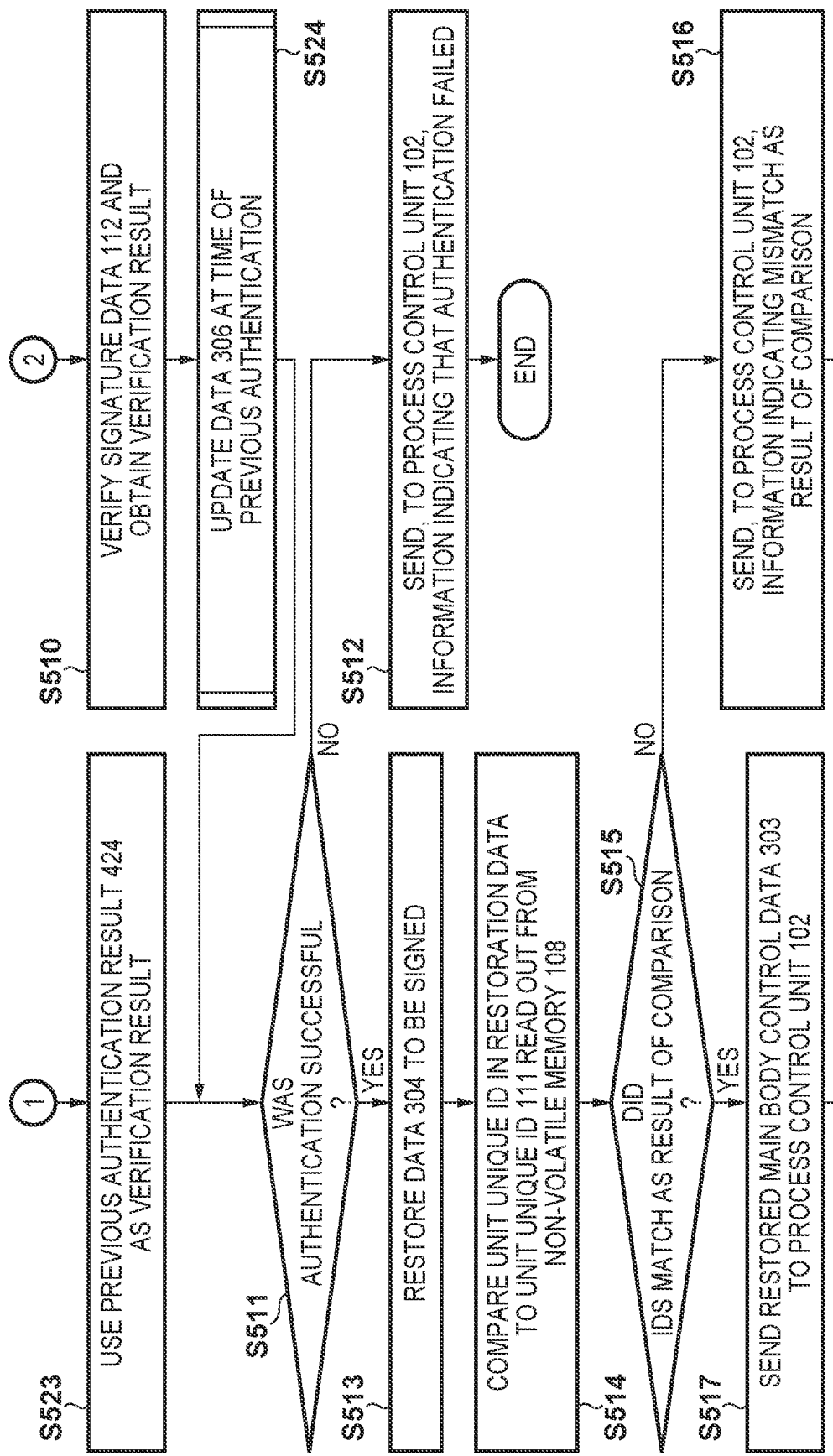
Figure 6:
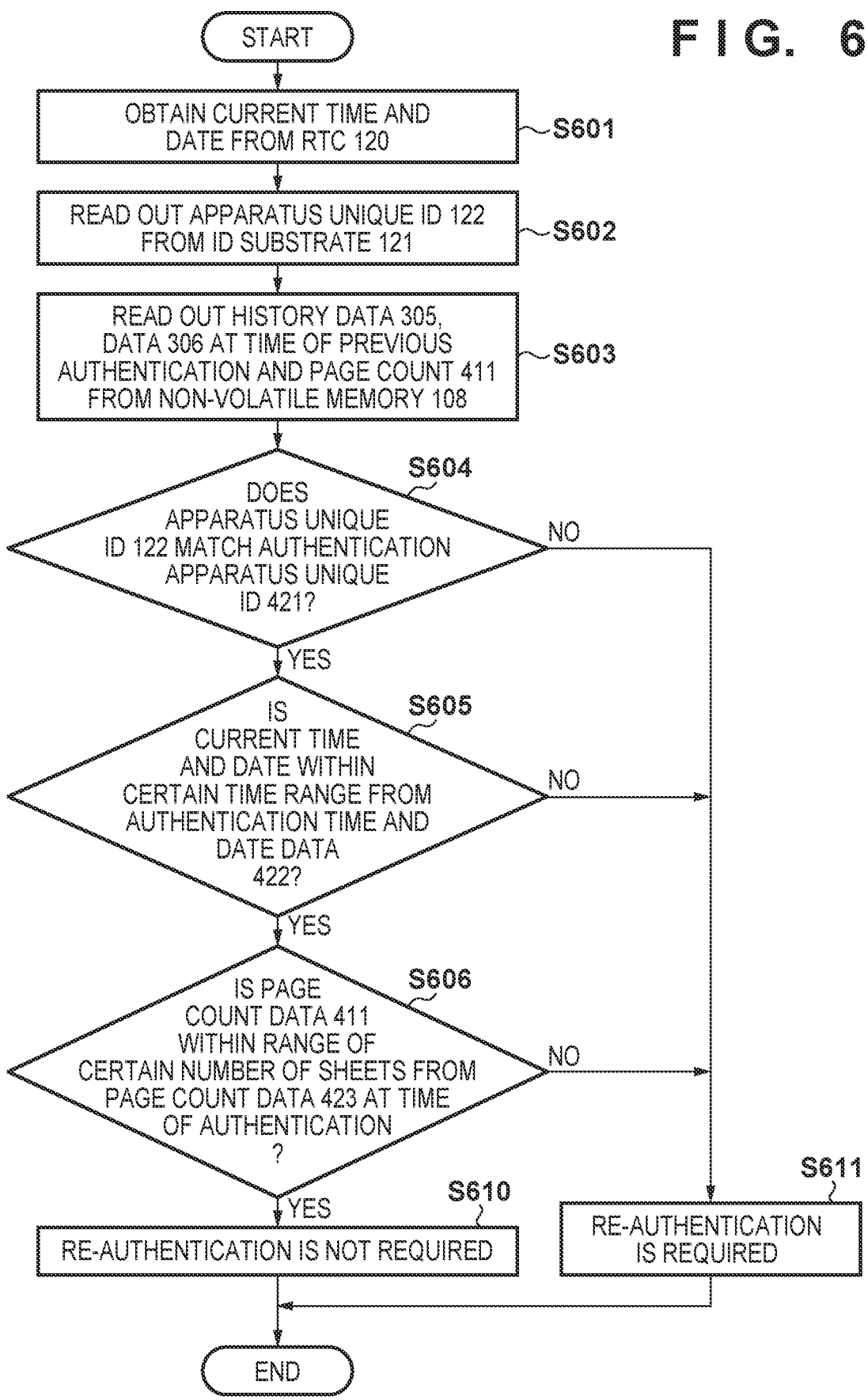
FIG. 6 is a flowchart used for determining whether or not a re-authentication process is required according to one embodiment.
Figure 7:
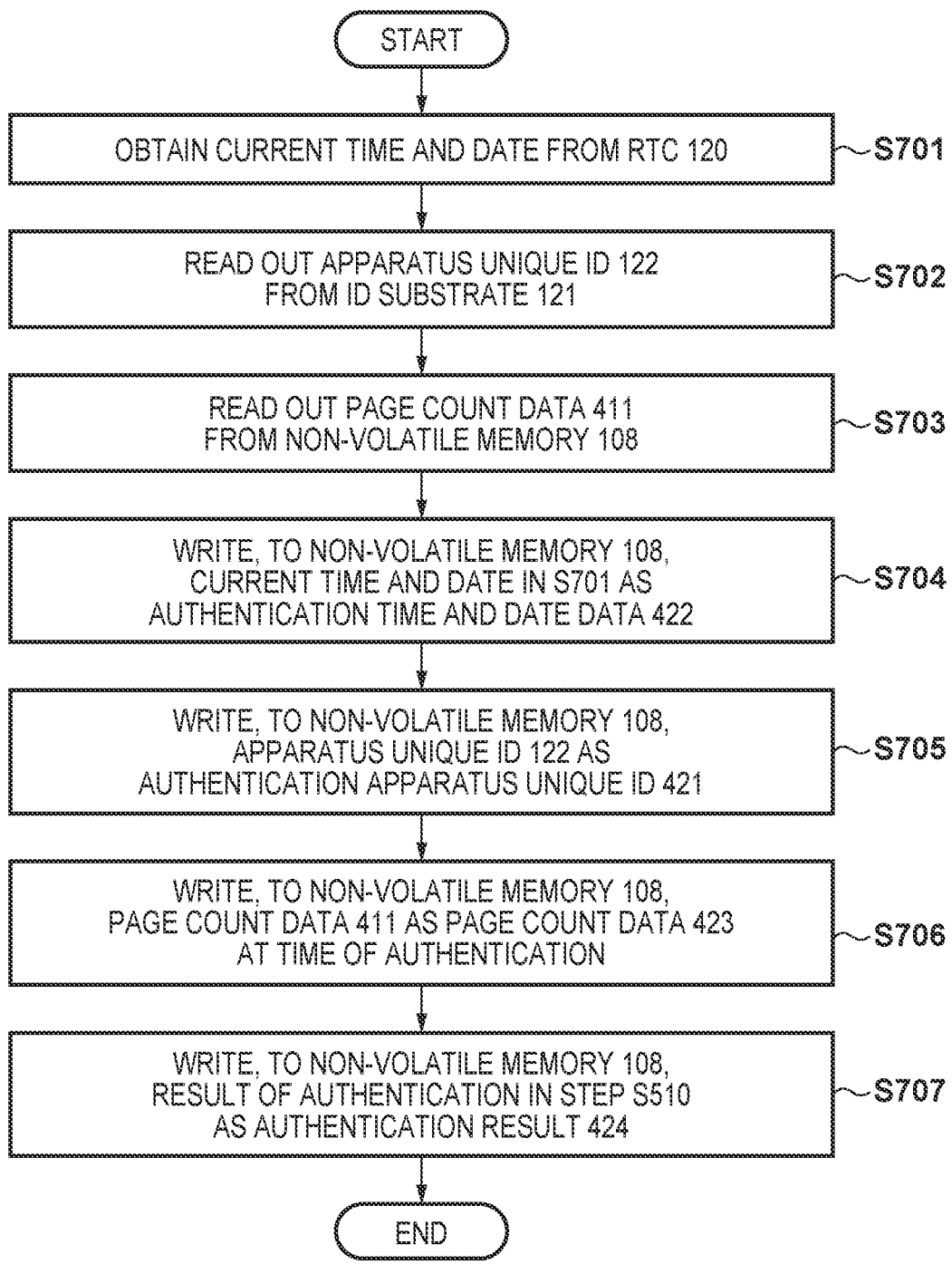
FIG. 7 is a flowchart used for determining whether or not a re-authentication process is required according to one embodiment.

Next, the processing procedure performed by the process control unit 102 from the time when the process cartridge 210 is mounted to the image forming apparatus 200 until when it is detected whether or not data stored in the non-volatile memory 108 of the IC tag is unauthorized will be described with reference to FIGS. 5 to 7. The process to be described below is realized by a CPU of the image forming apparatus 200 loading a control program stored in a storage medium such as an HDD to the memory 105 and executing the control program.

First, in step S530, the process control unit 102 detects whether or not the image forming apparatus has just been restored from sleep. Note that whether or not the image forming apparatus has just been restored from sleep can be detected with reference to the value of a flag provided in the memory 105, for example. In this case, this flag is set to true for a certain period of time after restoration from sleep. In the case of Yes, there is a possibility that the process cartridge 210 has been changed, and thus the procedure advances to step S502. In the case of No, the procedure advances to step S501.

In step S501, the process control unit 102 detects whether or not a cartridge door has been changed from Open to Closed. A flag indicating that the door for accommodating the cartridge has been opened/closed is held in the memory 105, and this detection is also performed with reference to the value of the flag, similarly to step S530, for example. In the case of Yes, there is a possibility that the process cartridge 210 has been changed, and thus the procedure advances to step S502. In the case of No, the procedure advances to step S532.

In step S532, the process control unit 102 detects whether or not page discharge for an image forming job (e.g., a print job) that is being processed has ended and there is no longer a subsequent job. In other words, it is determined that an image forming job that is being executed has ended, and there is no subsequent image forming job. Here as well, the process control unit 102 performs the detection with reference to information (e.g., a flag) stored in the memory 105. In the case of Yes, the procedure advances to step S502 in order to periodically perform process cartridge authentication. On the other hand, in the case of No, the process cartridge 210 has not been changed, and also the current time does not match a timing for carrying out periodical process cartridge authentication, and thus the procedure returns to start step S530, where determination as above-described is periodically repeated.

Note that in determination of steps S530, S501 and S532, a trigger is determined, based on state information (e.g., the above-described flag) indicating the state of the image forming apparatus 200, regarding whether or not a timing for executing cartridge authentication process has arrived. Therefore, in these determination processes, the CPU of the image forming apparatus 200 functions as trigger determination means. Accordingly, an authentication process can be executed at a necessary timing without causing delay in execution of an image forming job, and safety can be ensured. Furthermore, according to this embodiment, in the following processes, it is determined, from authentication information such as the last authentication result stored in a storage area of the process cartridge, whether or not an authentication process actually needs to be executed.

In step S502, the process control unit 102 reads out and obtains the unit unique ID 111, the signature data 112, the history data 305 and the data 306 at the time of the last authentication from the IC tag 101 added to the process cartridge 210, and the procedure advances to step S506. In step S506, the process control unit 102 checks, based on the unit unique ID 111, whether or not the process cartridge 210 that is mounted is a cartridge compatible with the image forming apparatus 200. In this step, the check is performed by comparing the compatible engine ID 402 that is included in the obtained unit unique ID 111 and indicates a compatible engine to an engine ID held by the memory 105 in advance. In the case where the IDs do not match, the procedure advances to step S507, where the process control unit 102 obtains information indicating that an incompatible cartridge has been inserted, and ends the process. On the other hand, in the case where the IDs match, the procedure advances to step S508.

In step S508, the process control unit 102 checks, based on the unit unique ID 111, whether or not the process cartridge 210 that is mounted is a cartridge of a correct color. In this step, it suffices to compare the color ID 403 included in the obtained unit unique ID 111 to a color ID corresponding to a cartridge slot held by the memory 105 in advance. In the case where the IDs do not match, the procedure advances to step S509, where the process control unit 102 obtains information indicating that a cartridge has been erroneously inserted, and ends the process. Specifically, here, it is determined that the cartridge is not inserted into an insertion location corresponding to a proper color, and erroneously inserted. On the other hand, in the case where the IDs match, the procedure advances to step S520, where the process control unit 102 determines whether or not a re-authentication process is necessary. The above-described determination in steps S506 and S508 is an example of determination made by re-authentication determination means.

Here, the processing procedure for determining whether or not a re-authentication process is necessary will be described with reference to FIG. 6. The determination process here is an example of determination made by the re-authentication determination means. In step S601, the process control unit 102 obtains the current time and date from the RTC 120. Subsequently, in step S602, the process control unit 102 reads out the apparatus unique ID 122 from the ID substrate 121. Furthermore, in step S603, the process control unit 102 reads out the history data 305, the data 306 at the time of the last authentication and the page count data 411 from the non-volatile memory 108 of the IC tag 101. Note that in the above step S602, information in the ID substrate 121 does not change, and thus a result of the first authentication loaded in a region in the memory 105 may be reused for the next time onwards.

Next, in step S604, the process control unit 102 determines whether or not the apparatus unique ID 122 matches the authentication apparatus unique ID 421. In the case where the IDs do not match, the procedure advances to step S611, where the process control unit 102 decides that re-authentication is necessary, and advances the procedure to step S521. On the other hand, in the case where the IDs match, the procedure advances to step S605, where the process control unit 102 determines whether or not the current time and date obtained in step S601 is within a certain time range from the authentication time and date data 422. Here, "within a certain time range" means that the current time and date is included in a period from the authentication time and date data 422 until a certain period (e.g., one week) elapses. In other words, here, it is determined whether or not the difference between the current time and date managed by the image forming apparatus 200 and a time and date indicated by authentication time and date data is within the certain time range. In the case where the current time and date is prior to the authentication time and date data 422, or in the case where a certain time has elapsed from the authentication time and date data 422, the current time and date is out of the certain time range. In the case where the current time and date is within the certain time range, the procedure advances to step S606, and in the case where the current time and date is not within the certain time range, the procedure advances to step S611. In step S611, the process control unit 102 decides that re-authentication is necessary, and advances the procedure to step S521.

In step S606, the process control unit 102 determines whether or not the page count data 411 is within the range of a certain number of sheets from the page count data 423 at the time of authentication. Here, "within the range of a certain number of sheets" means that the page count 411 is included in the range of the certain number of sheets (e.g., 100 sheets) or more added to the page count of the page count data 423 at the time of authentication. In the case where the page count 411 is smaller than the page count of the page count data 423 at the time of authentication, or in the case where the certain number of sheets or more is added to the page count of the page count data 423 at the time of authentication, the page count data 411 is out of the range of the certain number of sheets. If the page count data 411 is within the range of the certain number of sheets, the procedure advances to step S610, where it is decided that re-authentication is not necessary, and the procedure advances to step S521. On the other hand, if the page count data 411 is not within the range of the certain number of sheets, the procedure advances to step S611, where it is decided that re-authentication is necessary, and the procedure advances to step S521. In this manner, in the case where all of the three conditions of steps S604, S605 and S606 are satisfied, the procedure advances to step S610, and it is decided that re-authentication is not necessary.

Description will return to FIGS. 5A and 5B. If it is determined in step S520 whether or not a re-authentication process is necessary, the procedure advances to step S521, where the process control unit 102 branches the process in accordance with whether or not a re-authentication process is necessary. In the case where it is determined that a re-authentication process is not necessary, the procedure advances to step S523, where the process control unit 102 uses the last authentication result 424 as a verification result. On the other hand, in the case where it is determined that a re-authentication process is necessary, the procedure advances to step S510, where the process control unit 102 carries out signature data verification. Specifically, the process control unit 102 sends the obtained signature data 112 to the authentication unit 103, and the authentication unit 103 verifies the validity of the signature using the public key 110 stored in the memory 105. An algorithm corresponding to the restorable signature calculation 307 in FIG. 3 is used for signature verification. The procedure then advances to step S524, where the data 306 at the time of the last authentication is updated, and the procedure advances to step S511.

Here, a detailed processing procedure of the above step S524 for updating the last authentication result will be described with reference to FIG. 7. In step S701, the process control unit 102 obtains the current time and date from the RTC 120. In step S702, the process control unit 102 reads out the apparatus unique ID 122 from the ID substrate 121. In step S703, the process control unit 102 reads out the page count data 411 from the non-volatile memory 108 of the IC tag 101.

Next, in step S704, the process control unit 102 writes, to the non-volatile memory 108 of the IC tag 101, the time and date obtained in step S701 as the authentication time and date data 422. In step S705, the process control unit 102 writes the apparatus unique ID 122 as the authentication apparatus unique ID 421, to the non-volatile memory 108 of the IC tag 101. In step S706, the process control unit 102 writes the page count data 411 as the page count data 423 at the time of authentication, to the non-volatile memory 108 of the IC tag 101. In step S707, the process control unit 102 writes, to the non-volatile memory 108 of the IC tag 101, the result of authentication performed in step S510 as an authentication result 424. Due to the above processes, the data 306 at the time of the last authentication is updated to the latest state. After that, the procedure advances to step S511.

Description will return to FIGS. 5A and 5B. In step S510, the signature data 112 is verified, and a verification result is obtained. At this time, if the signature data 112 that is used has not been tampered with, authentication is successful, and if by any chance the signature data 112 has been tampered with, authentication fails.

In the case where in step S523, the last authentication result 424 was obtained as an authentication result, or in the case where in step S510, the signature data 112 was verified and an authentication result was obtained, the procedure advances to step S511. In step S511, the process control unit 102 branches the process in accordance with whether or not authentication was successful or failed. In the case where authentication failed, the procedure advances to step S512, where the authentication unit 103 sends, to the process control unit 102, information indicating that authentication failed, and ends the process.

On the other hand, in the case where authentication was successful, the procedure advances to step S513, where the authentication unit 103 executes restoration of the data 304 to be signed. The restoration process executed in step S513 is based on an algorithm corresponding to the restorable signature calculation 307 in FIG. 3, and for example, the restoration process of ISO 9796-2 and the like correspond to this. Subsequently, in step S514, the process control unit 102 sends the obtained unit unique ID 111 to the authentication unit 103, in order to check whether or not only the signature data 112 has been substituted for signature data for another image forming apparatus or signature data for another color. The authentication unit 103 compares partial data corresponding to the unit unique ID of restored restoration data to the unit unique ID 111 obtained from the process control unit 102, and the procedure advances to step S515.

In the case where the IDs do not match in step S515 as a result of comparison, the procedure advances to step S516, where the authentication unit 103 sends, to the process control unit 102, information indicating mismatch as a result of comparison, and ends the process. On the other hand, in the case where the IDs matched, the procedure advances to step S517, where the authentication unit 103 sends the restored main body control data 303 to the process control unit 102, and ends the process.

When unauthorized data detection ends, the process control unit 102 decides a process to be performed next, in accordance with information obtained when the process was ended. For example, in the case where information indicating that the cartridge has not been replaced is obtained, the toner fusing temperature data 406 before the door was opened is carried over without any change, and the data is used for performing correction control for an adjustment temperature of the fixing device 217. This makes it possible to realize fixing at an optimum temperature for the components of the toner 216 stored in the process cartridge 210.

On the other hand, a configuration may be adopted in which, in the case where information indicating that an incompatible cartridge has been inserted is obtained, a warning message indicating that an incompatible cartridge has been inserted is presented to the user, on an operation panel (not illustrated) installed in the image forming apparatus 200, and the image forming operation is stopped temporarily. Alternatively, the image forming operation may be started using initial setting control data of the image forming apparatus 200.

Also, a configuration may be adopted in which, in the case where information indicating that a cartridge has been erroneously inserted has been obtained, a warning message indicating that a cartridge has been erroneously inserted is presented to the user, on the operation panel installed in the image forming apparatus 200, and the image forming operation is stopped temporarily.

Also, a configuration may be adopted in which, in the case where authentication failure information was obtained and in the case where information indicating mismatch as a result of comparison was obtained, a warning message indicating that the process cartridge 210 that is unauthorized has been inserted is presented to the user, on the operation panel installed in the image forming apparatus 200, and the image forming operation is stopped temporarily. Alternatively, the image forming operation may be started using the initial setting control data of the image forming apparatus 200.

Also, a configuration may be adopted in which, in the case where the new main body control data 303 was obtained, the received toner fusing temperature data 406 is registered as the new main body control data 303, and the data is used to perform correction control of the adjustment temperature of the fixing device 217. This makes it possible to realize fixing at an optimum temperature for the components of the toner 216 stored in the process cartridge 210.

As described above, only in the case where it is determined in step S520 that a re-authentication process is required, a complicated process, namely, signature data verification that is performed in step S510 is carried out. In addition, in the case where it is determined that a re-authentication process is not necessary, the result at the time of the last authentication process is reused. This makes it possible to reliably verify whether or not the cartridge is a predetermined cartridge while suppressing the number of times of cartridge authentication.

Moreover, effects of another aspect of the present invention will be described. In the present invention, in the case where there is no subsequent job after printing ends, it is determined whether or not a re-authentication process for the process cartridge is to be performed. If an authentication process is executed under a condition that there is no subsequent job, the user does not need to wait for output start because of not being able to perform a printing process due to the authentication process. If an authentication process is performed on the process cartridge, and the condition and the result of the authentication process are recorded in the process cartridge, a re-authentication process is not performed if the current time and date is within a certain period of time, under the condition that an authentication process is not performed by another image forming apparatus. Accordingly, the user does not need to wait due to an authentication process after the power supply is turned on or after restoration from sleep.

Effects of yet another aspect will be described. Regarding the serial numbers 405 of all process cartridges that are predetermined cartridge, there is no overlap of numbers. On the other hand, there is a possibility that the number of a process cartridge overlaps the number of a predetermined process cartridge or a cartridge which is not the predetermined process cartridge. Therefore, it is difficult to distinguish between process cartridges only from the same serial number, and thereby there is a risk that reusing an authentication result leads to erroneous determination. On the other hand, it can be guaranteed that the apparatus unique ID 122 is different for each image forming apparatus. A risk of erroneously determining the combination of a process cartridge and an image forming apparatus when an authentication process is executed can be avoided or reduced, by storing the authentication apparatus unique ID 421 in the process cartridge.

As described above, according to the image forming apparatus of this embodiment, an identifier, a time, page count data information and an authentication result for each image forming apparatus used at the time of the last cartridge authentication can be recorded in a cartridge. Therefore, the last authentication result can be carried over and used under a certain condition. In addition, in the same image forming apparatus as the image forming apparatus used for the last cartridge authentication, if a time that lapsed from an authentication verification time is within a certain time range, and printing is within the range of a certain number of sheets from the authentication verification time, an authentication process of the cartridge is not performed, and the last authentication result is used. On the other hand, in the case where the image forming apparatus used at the time of the last cartridge authentication does not match the image forming apparatus, an authentication process of the cartridge is performed.

Even in the case where the image forming apparatus used at the time of the last cartridge authentication matches the image forming apparatus, if a certain time or more has elapsed from the authentication verification time, or if printing in the range of a certain number of sheets or more was performed, an authentication process of the cartridge is performed. This makes it possible to suitably verify whether or not the cartridge is a predetermined process cartridge while suppressing the number of times of cartridge authentication.

Modifications

The present invention is not limited to the above-described embodiment, and various variations can be made. In the first embodiment above, the time when an authentication process was performed is recorded in the IC tag 101 of the cartridge, and the time when authentication was performed last time is compared to the current time, thereby determining whether or not a re-authentication process is required. In contrast, for example, authentication execution may be managed and determined based on a time during which the image forming apparatus is effective. Specifically, it is also possible to use a distinguishing method only based on an operation time such as a time when printing is being performed, without performing counting while the power supply is disconnected, or during a time when the state is a sleep state.

Moreover, regarding a page count, it may be determined whether or not to perform an authentication process, with weights differing between monochrome printing and color printing or weights differing for each size. For example, control may be performed such that the weight is changed between monochrome printing and color printing, or A3 size printing is weighted by twice the weighting of A4 size printing, for example.

Moreover, in the first embodiment above, whether or not re-authentication is to be performed is determined based on whether or not the difference between the page count at the time when an authentication process was performed and the page count at the time when it is determined whether or not to perform re-authentication is being performed is within the range of a certain number of sheets. In contrast, management may be performed in a form of the page count of pages that can be output after authentication completes. For example, information indicating that printing up to 100 sheets is possible after authentication is complete is recorded in the cartridge. If printing of 10 sheets is performed with the cartridge, the record in the cartridge is updated to information indicating that printing up to 90 sheets is possible. A configuration can be applied in which, in the case where this is 0 or less, a re-authentication process is executed.

Moreover, regarding a cartridge the last authentication of which was determined to have failed and recorded as the last authentication result, a re-authentication process is also expected to fail. Therefore, regarding a cartridge in which information indicating that an authentication result is a failure is recorded, it may be regarded that authentication has failed, without performing a re-authentication process. This makes it possible to promptly notify the user who replaced the cartridge of a warning, and to reduce execution of unnecessary processing. Note that as described above, there is a risk that a cartridge is replaced under a condition that the printer cannot recognize that cartridge, and even with a cartridge that was successfully authenticated once, it is desirable that a re-authentication process is always carried out in the case where the condition is met.

Furthermore, in the first embodiment above, an aspect in which control is performed in the image forming apparatus has been described, but the present invention can also be realized by a printing system constituted by a combination of an external controller and a printer engine. A portion of a complicated calculation process that is required for an authentication process may be handled by a server on a network. Alternatively, the results are accumulated as a list on a server on a network, and using that list, determination whether or not a re-authentication process is required may be shared by a plurality of devices.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-023981 filed on Feb. 10, 2016, which is hereby incorporated by reference herein in its entirety.

What is claimed is:

1. An image forming apparatus for forming an image on a sheet using recording material in a storage cartridge which is attachable to and detachable from the image forming apparatus, the apparatus comprising:
    one or more controllers configured to function as:
        a unit configured to execute an authentication process for determining whether or not correct signature information is stored in a storage medium attached to the storage cartridge;
        a unit configured to, based on a determination result indicating that the correct signature information is stored in the storage medium, (i) write, as a latest authenticator ID, identification information of the image forming apparatus to the storage medium, (ii) write, as latest authentication timing information, timing information of the authentication process to the storage medium, and (iii) permit execution of an information forming process,
    wherein the latest authentication timing information stored in the storage medium is updated in accordance with execution of a further authentication process.

2. The image forming apparatus according to claim 1, wherein
    the storage medium is an IC tag.

3. The image forming apparatus according to claim 1, further comprising:
    an authentication circuit for executing the authentication process.

4. The image forming apparatus according to claim 1, wherein
    predetermined information is notified in accordance with failure of the authentication process.

5. The image forming apparatus according to claim 1,
    wherein the authentication process is a process to judge that the signature information in the storage medium is information that deserves trust or not.

6. The image forming apparatus according to claim 1, wherein the one or more controllers are configured to further function as,
    a unit configured to perform a determining process to determine, based on the latest authentication timing information stored in the storage medium and current information including at least a current time or a total number of image formations, at a predetermined timing, whether or not to perform the authentication process.

7. The image forming apparatus according to claim 6, wherein
    the predetermined timing is at least one of a timing when restoring from sleep, a timing when closing a cartridge door and a timing when terminating a print job.

8. The image forming apparatus according to claim 6,
    wherein, in the determining process, the image forming apparatus obtains, from the storage medium, a previous authenticator ID corresponding to an apparatus which performed the previous authentication process, and obtains, based on a result that the previous authenticator ID and the identification information of the image forming apparatus is not matching, a result of the determining process indicating that the authentication process should be performed.

9. The image forming apparatus according to claim 6,
    wherein the one or more controllers are configured to further function as a unit configured to obtain a current time and date, and
    wherein, in the determining process, the one or more controllers obtain, from the storage medium, previously stored time and date as one of the latest authentication timing information and, based on the stored time and date and the current time and date satisfying a predetermined relationship, obtain a result of the determining process indicating that the authentication process should be performed, even if the latest authenticator ID matches the identification information of the image forming apparatus.

10. The image forming apparatus according to claim 6, wherein
the one or more controllers are configured to further function as a unit configured to obtain a total number of image formations executed by the image forming apparatus, and
wherein, in the determining process, the one or more controllers obtain, from the storage medium, a previously stored number of image formations as one of the latest authentication timing information, based on the stored number of image formations and the total number of image formations executed by the image forming apparatus satisfying a predetermined relationship, obtain a result of the determining process indicating that the authentication process should be performed, even if the authenticator ID matches the identification information of the image forming apparatus.

11. The image forming apparatus according to claim 6, wherein
the authentication process is skipped in accordance with a determination result of the determining process.

12. The image forming apparatus according to claim 1, wherein
the authentication process includes:
decrypting encryption data obtained from the storage medium.

13. The image forming apparatus according to claim 12, wherein the authentication process further includes:
determining whether or not first information included in information obtained by the decryption matches second information which is not encrypted and is stored in the storage medium.

14. The image forming apparatus according to claim 13, wherein the first information and the second information are unique information of the storage cartridge.

15. The image forming apparatus according to claim 13, wherein the unique information of the storage cartridge includes at least one of a unit ID, a compatible engine ID, a color ID, a date of manufacture, and a serial number.

16. The image forming apparatus according to claim 13, wherein the information obtained by the decryption includes control information of the predetermined process in addition to the first information.

17. The image forming apparatus according to claim 13, wherein the information obtained by the decryption includes characteristic information of the recording material in addition to the first information.

18. The image forming apparatus according to claim 12, wherein the authentication process further includes verifying the encryption data.

19. The image forming apparatus according to claim 18, wherein
the one or more controllers are verifying the encryption data by using a public key.

20. The image forming apparatus according to claim 12, wherein the encryption is an encryption complying with ISO9796-2.

21. The image forming apparatus according to claim 1, wherein
the execution of the image forming process using recording material in a storage cartridge is not allowed while the authentication process is being executed.

* * * * *